(No Model.)
W. B. UPTON.
SPEEDING DEVICE FOR STAMP MILLS.
No. 268,963. Patented Dec. 12, 1882.
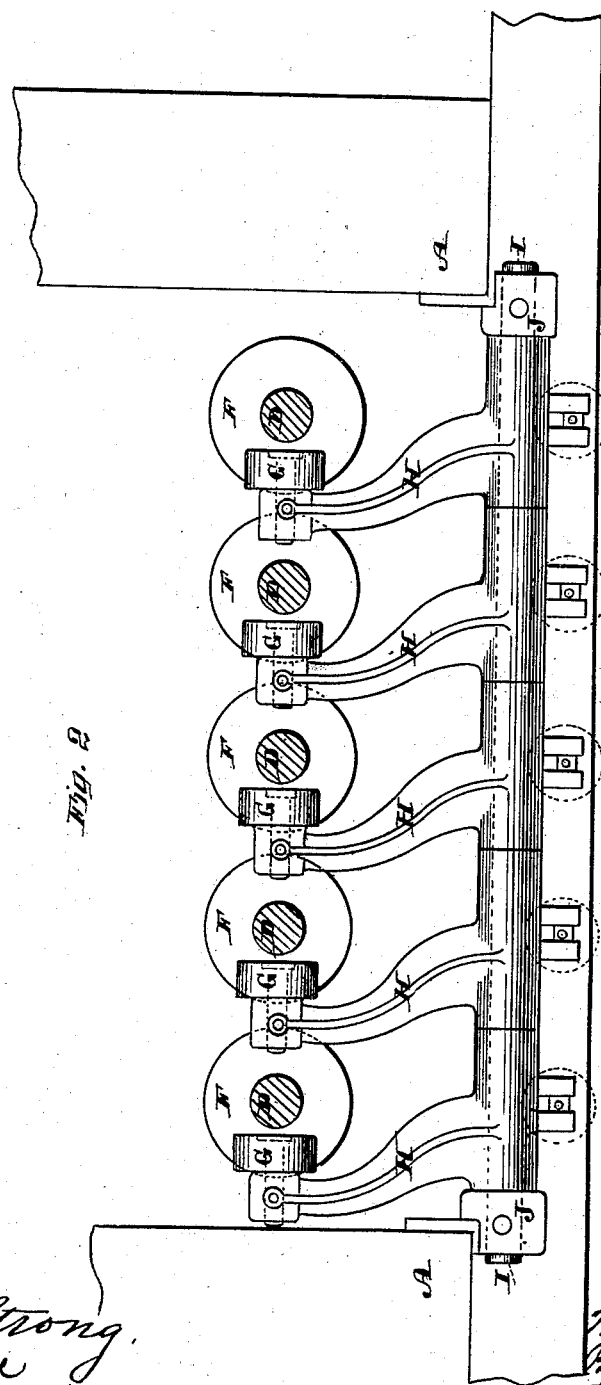
Witnesses,
Geo. H. Strong.
S. H. Nourse
Inventor,
Wm. B. Upton
By Dewey & Co.
Attorneys

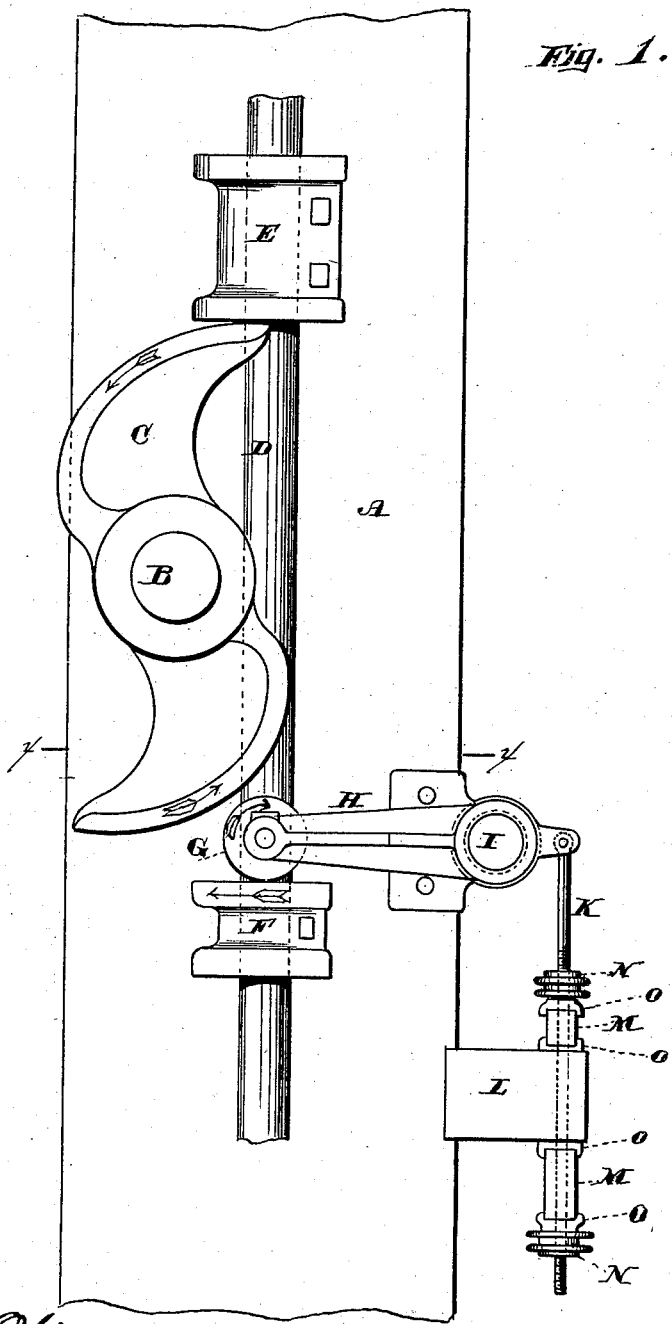

UNITED STATES PATENT OFFICE.

WILLIAM B. UPTON, OF SAN FRANCISCO, CALIFORNIA.

SPEEDING DEVICE FOR STAMP-MILLS.

SPECIFICATION forming part of Letters Patent No. 268,963, dated December 12, 1882.

Application filed March 31, 1882. (No model.)

*To all whom it may concern:*

Be it known that I, WILLIAM B. UPTON, of the city and county of San Francisco, State of California, have invented an Improved Speeding Device for Stamp-Mills; and I do hereby declare the following to be a full, clear, and exact description thereof.

My invention relates to means for increasing the speed at which the stamps of quartz-crushing batteries may be driven; and it consists in the combination of devices hereinafter described and claimed.

A roller is fixed to the end of a horizontal arm, so as to intervene between the cam and the secondary tappet, the arm being journaled loosely upon a horizontal shaft, and a screw-stem extends downward from the rear end of said arm, carrying nuts and elastic buffers, by which adjustment and the proper action of the roller are effected.

Referring to the accompanying drawings for a more complete explanation of my invention, Figure 1 is a side elevation, showing a stamp-mill provided with my attachment. Fig. 2 is a horizontal section through *x x*, Fig. 1, being a top view of the supplemental tappets and arms.

A are the side timbers of a battery-frame. B is the cam-shaft, upon which the cams C are keyed, and D D are the stamp-stems. These stems have stamps secured to the lower ends, and tappets E are keyed to the stems at points, so that as the cams are revolved by their shaft they will raise them and the stamps, and as the points of the cams pass from beneath them the stamps will be allowed to fall. As ordinarily constructed, the maximum speed obtained is about ninety drops per minute. This rate of operation is due to the gravity of the stamp alone, and it is evident that when I add to the force of gravity the power of the revolving cam for a positive downward throw I obtain a quicker drop, and the upper tappet can be more quickly placed to be again raised by the cam. A roller, G, is journaled to an arm, H, by which it is supported so as to rest upon the top of the tappet F, and as the upper arm of the cam leaves the tappet E the lower arm strikes this roller, and through it acts upon the tappet F and the stamp-stem to start them down again. As the action of the cam upon tappet E causes the stamp to revolve this movement is communicated to the roller G, so that it turns in the proper direction to offer the least resistance to the action of the lower cam when struck by it.

The arm H, to which the roller G is journaled, extends horizontally a short distance, and has a hub, which is bored to fit loosely upon a shaft, I, which is supported in boxes J, bolted to the frame-timbers A. From the rear end of this arm, which projects slightly behind the hub, a rod, K, extends downward through the timber L, with plates and elastic buffers M upon each side of the timber, which is bolted to the frame A. The rod has screw-threads cut upon it, and nuts N screw down upon washers or plates O, so as to compress the buffers to any desired extent. By these nuts the position of the arm and roller may also be changed to allow the tappet F to be raised or lowered upon the stem when desired.

Having thus described my invention, what I claim as new, and desire to secure by Letters Patent, is—

The stamp-stem D, having the two tappets E F, and the revolving cam B, in combination with the roller G, the arm H, the shaft I, the rod K, the guide L, the elastic buffers M, and the adjusting-nuts N, substantially as herein described.

In witness whereof I hereto set my hand.

WILLIAM B. UPTON.

Witnesses:
S. H. NOURSE,
G. W. EMERSON.